Figure 1:
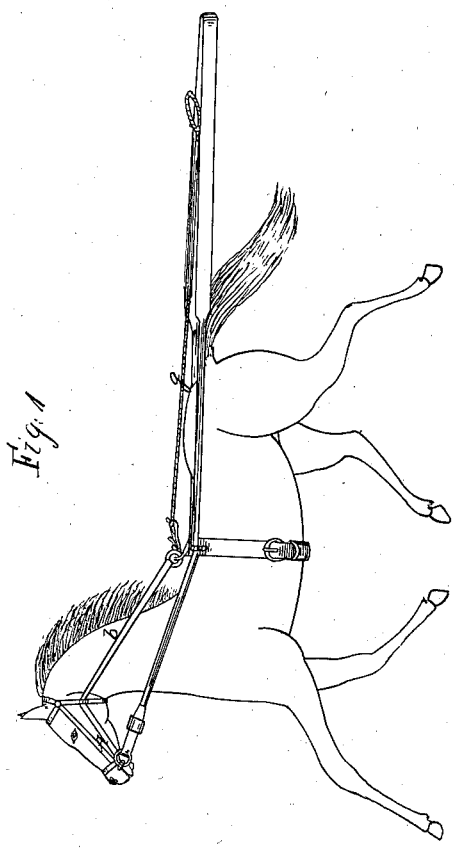

Westbrook & Doan
Check Rein
No. 74,780    Patented Feb. 25, 1868

Witnesses
J. W. Master
J. A. Ellis

Inventor
A. Westbrook
S. O. Doan
per
J. H. Alexander
Atty

United States Patent Office.

ABRAM WESTBROOK AND STEPHEN O. DOAN, OF LEONA, PENNSYLVANIA.

Letters Patent No. 74,780, dated February 25, 1868.

IMPROVEMENT IN DETACHING CHECK-REINS.

*The Schedule referred to in these Letters Patent and making part of the same.*

TO ALL WHOM IT MAY CONCERN:

Be it known that we, ABRAM WESTBROOK and STEPHEN O. DOAN, of Leona, in the county of Bradford, and State of Pennsylvania, have invented certain new and useful Improvements in the Mode of Detaching Check-Reins; and we do hereby declare that the following is a full, clear, and exact description thereof, reference being had to the accompanying drawings, and to the letters of reference marked thereon, which form a part of this specification, in which is represented a horse harnessed, and to the harness is attached our improvement.

The object of our invention is to enable the driver, while seated in the vehicle, to unrein and rein his horse at pleasure; and the nature of it consists, first, in the employment of an India-rubber check-rein, and second, in attaching to the check-rein a cord, which may be confined for a suitable length or distance in one of the driving-reins, substantially in the manner and for the purpose hereinafter set forth.

To enable others to avail themselves of the benefits of our invention, we will now describe its construction and operation.

A represents the ordinary bridle, provided with an India-rubber check-rein, $b$, which is held in the usual manner on the harness-saddle. $g$ represents a small round cord, made of leather, silk, or any other suitable material. This cord enters the rein about a foot or more from its upper end, and is confined within said rein, in such a manner that it will slip perfectly free and easy. The upper end of said cord is provided with a suitable device for attaching it to the check-rein, as seen in the drawing, while its opposite end is furnished with a loop or ring, in order that it may be readily operated while the driver is seated.

The merits of our invention consist, first, in its perfect simplicity, second, in its accomplishing exactly the object for which it is designed, and third, in the fact of its obviating entirely the necessity of the driver leaving his seat to unrein the horse for water or any other cause.

Having thus described our invention, what we claim as new, and desire to secure by Letters Patent, is—

1. A cord, attached to the check-rein, and extending back and confined in one of the driving-reins, substantially for the purpose described.

2. The combination of a check-rein with a cord for detaching and attaching the same, substantially as specified.

In testimony that we claim the foregoing as our own, we affix our signatures in presence of two witnesses.

ABRAM WESTBROOK,
STEPHEN O. DOAN.

Witnesses:
B. W. MORSE,
J. CAMPBELL.